United States Patent [19]

Okada

[11] 4,266,753
[45] May 12, 1981

[54] BUTTERFLY VALVE

[75] Inventor: Yoshitsugu Okada, Hirakata, Japan

[73] Assignee: Kubota, Ltd., Osaka, Japan

[21] Appl. No.: 926,345

[22] Filed: Jul. 20, 1978

Related U.S. Application Data

[63] Continuation of Ser. No. 732,846, Oct. 18, 1976, abandoned.

[30] Foreign Application Priority Data

| Oct. 18, 1975 | [JP] | Japan | 50-125515 |
| Oct. 18, 1975 | [JP] | Japan | 50-125516 |
| Oct. 16, 1976 | [JP] | Japan | 51/124141 |

[51] Int. Cl.² .............................................. F16K 1/22
[52] U.S. Cl. ................................. 251/305; 251/306; 251/362; 251/365
[58] Field of Search ............... 251/305, 306, 307, 362, 251/365; 29/156.4 WL

[56] References Cited

U.S. PATENT DOCUMENTS

| 2,011,641 | 8/1935 | Kruse | 251/305 |
| 2,387,971 | 10/1945 | Aspin et al. | 29/156.4 WL |
| 3,475,007 | 10/1969 | Fawkes | 251/305 |
| 3,525,499 | 8/1970 | Geiselman et al. | 251/306 |
| 3,684,239 | 8/1972 | Schwartzbart et al. | 251/307 |
| 4,020,869 | 5/1977 | Davis et al. | 251/307 |
| 4,037,819 | 7/1977 | Kindersley | 251/306 |
| 4,058,290 | 11/1977 | Nelimarkka | 251/306 |

FOREIGN PATENT DOCUMENTS 583610  8/1933  Fed. Rep. of Germany ........... 251/306

Primary Examiner—William R. Cline
Assistant Examiner—H. Jay Spiegel
Attorney, Agent, or Firm—Edwin E. Greigg

[57] ABSTRACT

In a butterfly valve comprising a valve housing including a cylindrical fluid passage and a disc-shaped valve body rotatable within the housing, a hard annular seat provided in the housing and a hard annular rim defined on the periphery of the valve body are adapted to contact one another over the entire circumference when the valve is closed. The valve of the above construction is very easy to manufacture and yet has a good sealing performance.

8 Claims, 10 Drawing Figures (Prior Art)

(Prior Art)

BUTTERFLY VALVE

This a continuation, of application Ser. No. 732,846, filed Oct. 18, 1976, now abandoned.

BACKGROUND OF THE INVENTION

1. Field of the Invention

This invention relates to a butterfly valve comprising a valve housing including a cylindrical fluid passage, a disc-shaped valve body rotatable about an axis vertical or substantially vertical to the central axis of the fluid passage, and a drive mechanism to turn and lock the valve body, wherein a hard annular seat provided in the housing is adapted to contact a hard annular rim defined on the periphery of the valve body over the entire circumference thereof when the valve body is vertical or substantially vertical to the axis of the fluid passage.

2. Description of the Prior Art

In a valve of this kind, both the seat and the rim are of rigid material such as metal, synthetic resin and hard rubber, which offers an advantage of their being invulnerable to the wearing action of sand and the like contained in fluids, hence long life. Further, since the valve body assumes a position normal to the axis of the fluid passage to close it, the valve body has the shape of a disc, which means an advantage of easiness in manufacture. But, on the other hand, the seat and the rim must have surfaces finished with high precision for tight sealing purposes, thus posing a problem of manufacture in respect of surface finish.

As shown in FIG. 8, the conventional seat 17 has a contacting surface that meets the side surface E of a cone. Generally, because of the functional nature of cutting machines, it is difficult to attain precision in finishing objects in the shape of the side surface of a cone. Thus, improvement on the seat construction is desired for easiness of manufacture and for higher precision in finishing work.

SUMMARY OF THE INVENTION

In view of the above-noted situation, this invention intends to provide an improved seat of very simple design to ease the finishing work of the seat surface and to further the quality of precision finish, while retaining the advantage of the rigid seat discussed hereinbefore.

The butterfly valve according to this invention is characterized in that the seat provided in the housing has a contacting surface to coincide with the peripheral surface of an imaginary cylinder having an axis slanted with respect to the axis of the fluid passage in the direction of the rotation of the valve body.

By shaping the seat surface so as to meet a cylindrical surface, it is now easy to finish the seat surface with high precision with a rotary drive mechanism commonly employed on cutting machines. Since the improvement consists in an extremely simple, modified form of the seat surface, there is a great advantage in practice of being free from increases of material and cost.

It is an object of the present invention to provide a butterfly valve that is capable of good sealing performance and yet relatively easy to manufacture.

Another object of this invention is to provide a butterfly valve capable of tolerating errors that occur during manufacturing process and performing good sealing.

Other objects and advantages will be apparent from the following description.

DESCRIPTION OF THE PREFERRED EMBODIMENTS

Figure 1:
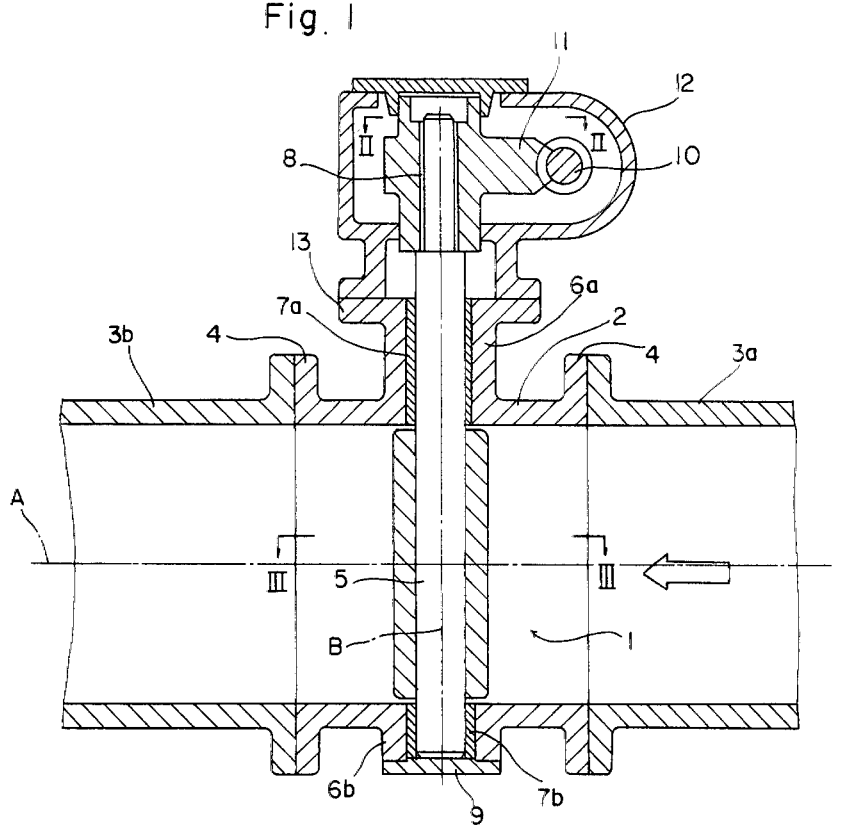
FIG. 1 is a view in vertical section showing a butterfly valve according to this invention.
Figure 2:
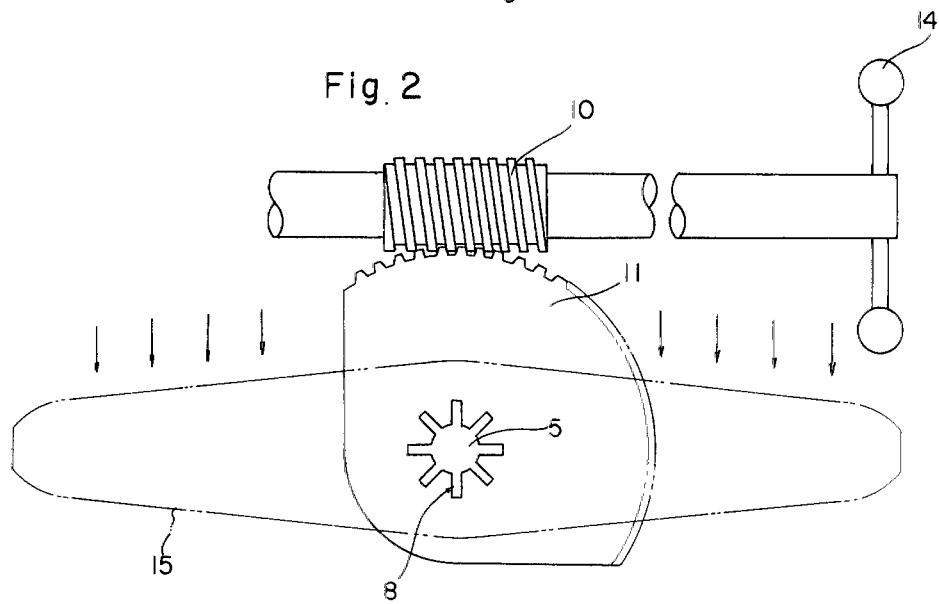
FIG. 2 is a view taken along line II—II of FIG. 1.

The mode of practising the invention will now be described with reference to the drawings. A cast-iron valve housing 2 having a cylindrical fluid passage 1 is integrally provided with flanges 4 to be coupled to pipes 3a, 3b by means of bolts and nuts, and with cylindrical parts 6a, 6b to receive a rotatable stem 5 having an axis B at right angles with axis A of fluid passage 1. Stem 5 is rotatably supported by cylindrical parts 6a, 6b through collars 7a, 7b respectively. One end of stem 5 is provided with a spline 8 which protrudes from cylindrical part 6a. The other end of stem 5 rests in cylindrical part 6b which is closed with a cap 9.

Cylindrical part 6a is provided with a flange 13 for mounting a case 12 by means of bolts and nuts, which case encloses a worm 10 and a worm gear 11 each rotatable and meshing with one another. Worm gear 11 is in spline engagement with rotatable stem 5, whereby stem 5 is actuated by turning a handle 14 mounted on worm 10.

A metal, disc-shaped valve body 15 is secured on rotatable stem 5. Fluid passage 1 is completely closed when valve body 15 is vertical or about vertical to axis A of fluid passage 1, and it is fully open when valve body 15 is parallel or about parallel to axis A.

Figure 3:
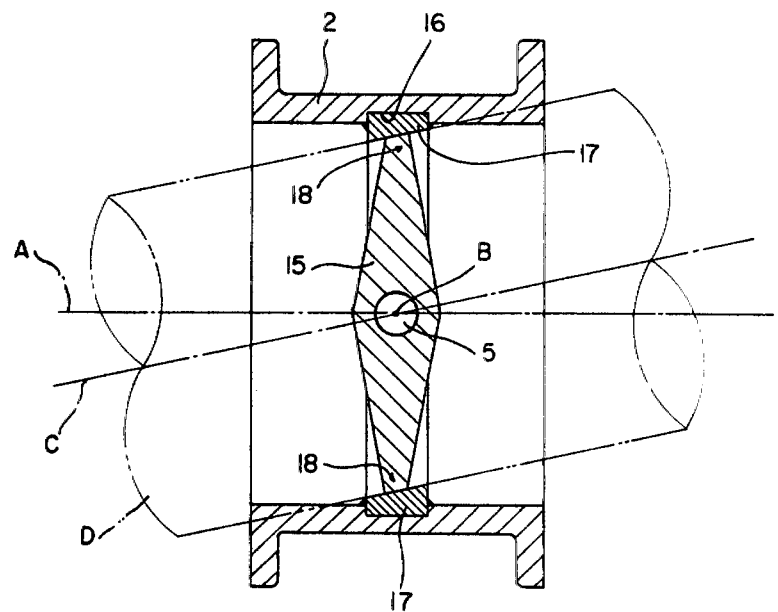
FIG. 3 is a sectional view taken along line III—III of FIG. 1.

An annular groove 16 is defined on the inner surface of valve housing 2, and an annular metal seat 17 is fitted in groove 16 and securely welded to housing 2. On the periphery of valve body 15 is defined an annular rim 18 which, when valve body 15 is in the closed position, is adapted to come into tight contact with seat 17 on housing 2 to maintain a sufficiently seep-proof condition. As shown in FIG. 3, seat 17 has a contacting surface that is shaped to coincide with the peripheral surface of an imaginary cylinder D having an axis C which is slanted with respect to axis A of the fluid passage in the direction of the rotation of the valve body, and rim 18 is adapted to meet the said contacting surface.

Figure 4:
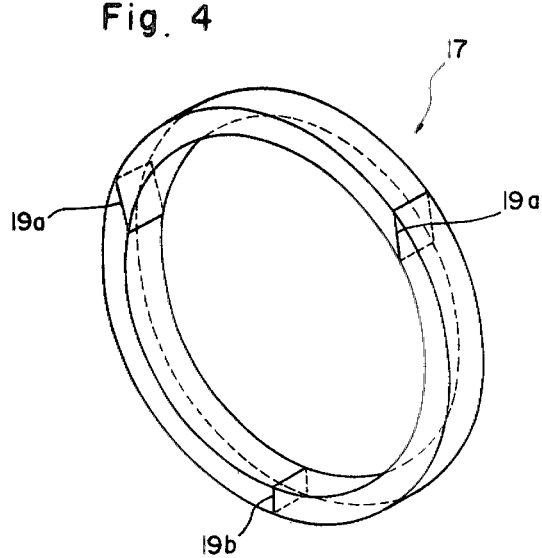
FIG. 4 is a perspective view of an annular seat.

As shown in FIG. 4, seat 17 is circumferentially divided into three parts, and cutting planes 19a at both ends of one part thereof are circumferentially slanted with respect to the radius of annular seat 17, the remaining cutting plane 19b being arranged radially of seat 17. In this way, seat 17 is capable of being fitted into groove 16 with ease to assume the form of a ring.

Figure 5:
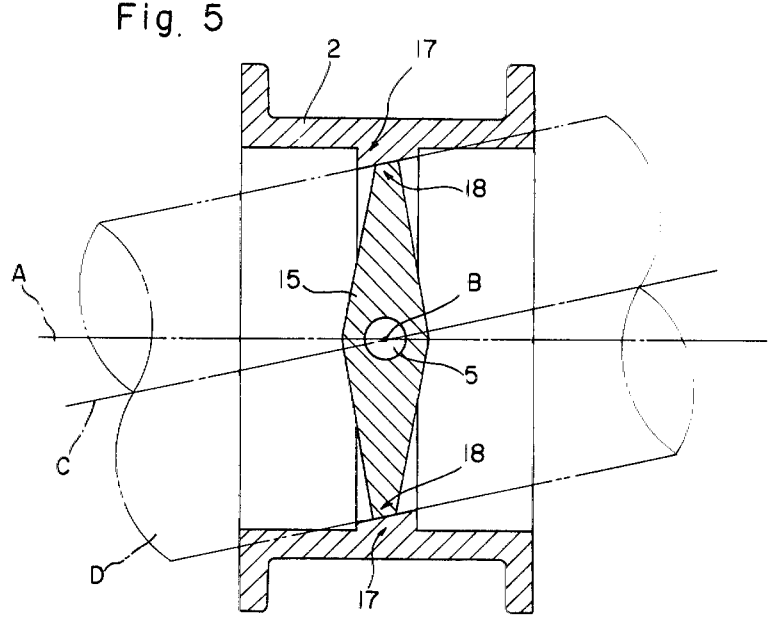
FIGS. 5 through 7 are sectional views of the principal part of the butterfly valve each showing a modification in the seat attachment.

Seat 17 can be modified in various ways as following. FIG. 5 shows seat 17 formed integrally with valve housing 2, which renders the manufacture easy.

Figure 6:
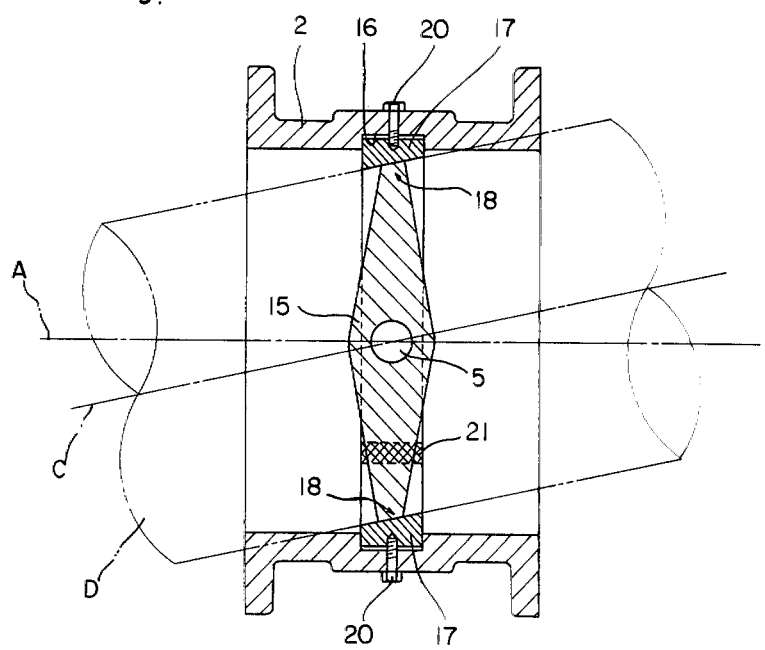

FIG. 6 shows another example wherein seat 17 fitted in groove 16 is secured to housing 2 with bolts 20, and at the same time is divided in the circumferential direction. The gaps formed at the dividing parts are each filled with a deformable packing 21 to render adjustable the relative position between seat 17 and rim 18 of valve body 15.

Figure 7:
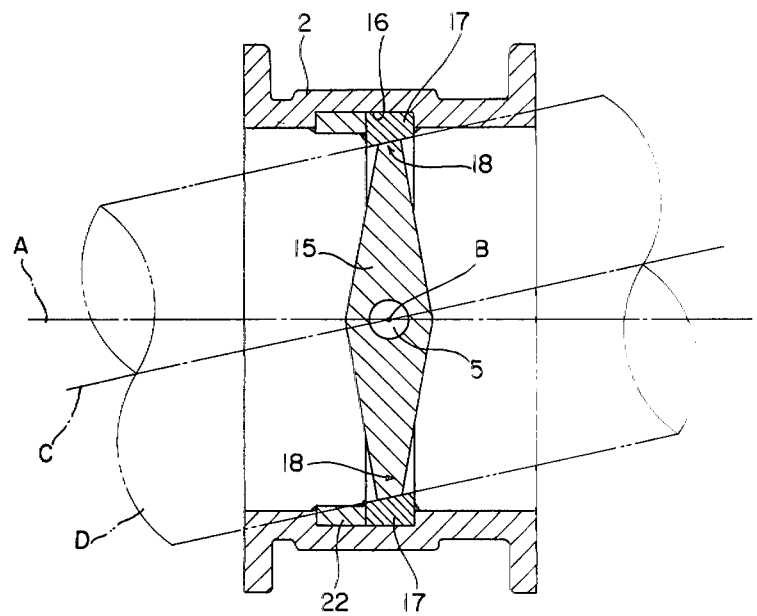

Seat 17 in FIG. 7 has cutting planes 19 all arranged radially thereof for the purpose of simplicity. Groove 16 has a width more than twice that of seat 17 to accommodate a spacer 22 for securely holding seat 17 at one side of groove 16; hence easy fitting of seat 17 into groove 16.

Annular seat 17, whether divided or not, may be cooled to contact prior to placing in groove 16, and thereafter it will expand and fit itself tight against housing 2. This step will make the fitting work easy and simplify the arrangement.

In case seat 17 is circumferentially divided for fitting into groove 16, the number of divisions is optional, and one slanted cutting plane (19a) is sufficient to render the fitting work easy. It is advantageous in manufacture to provide many radial cutting planes (19b). With regard to the number of divisions, seat 17 can be fitted into groove 16 if divided into at least two parts. That is, two bow-like seat parts are placed in groove 16 and then spaces between the two parts are filled with packings or the like.

Seat 17 and rim 18 are generally made of metal, but other tenacious materials such as sintered metal, various hard plastics, hard rubber, etc. may be used. In short, they could be of any material that is strong against wear and deformation.

A solid contact between seat 17 and rim 18 is obtained by slightly staggering (by a few millimeters) between the axis of rotatable stem 5 of valve body 15 and axis A of fluid passage 1.

For rotating valve body 15, an electric motor or other drive means may be used, and the interlocking mechanism may be modified in various ways. These elements are referred to in this specification as drive mechanism.

Figure 9:
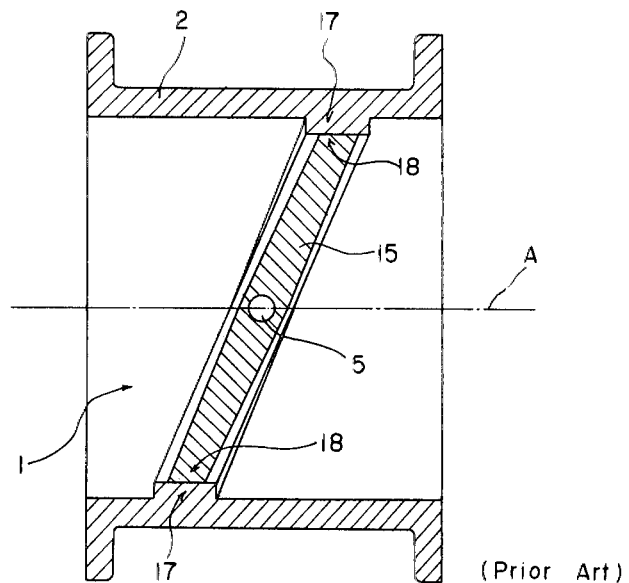

A conventional butterfly valve as shown in FIG. 9 has a valve body 15 inclined relative to the axis A of fluid passage 15 when the valve is completely closed. This arrangement requires a complicated shape of seat 17 provided on the inner surface of housing 2. Not only is the shaping work of such seat difficult, but the valve body is of considerably large size, raising manufacturing cost.

Figure 8:
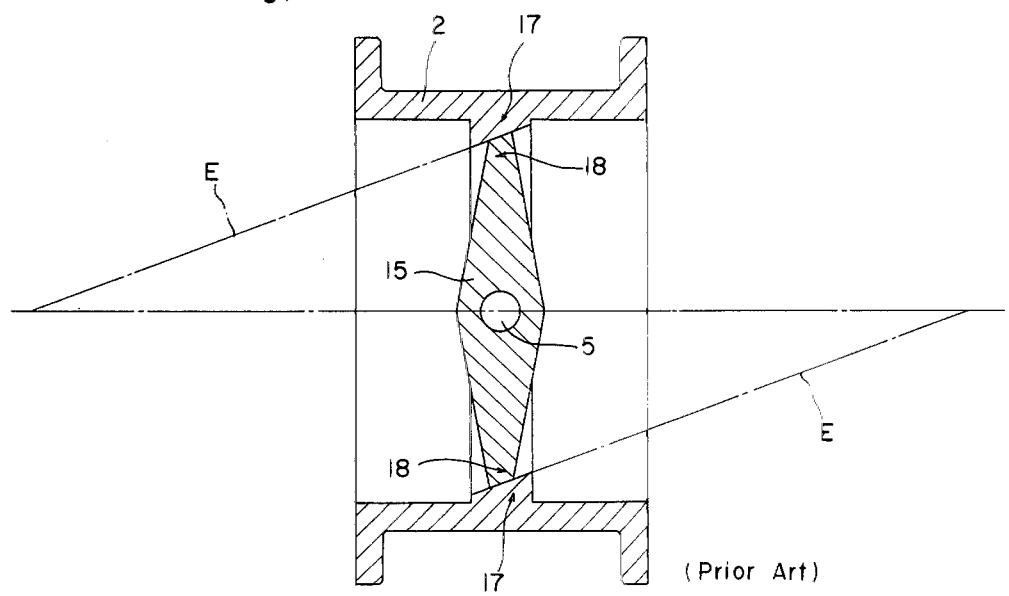
FIGS. 8 through 10 are sectional views each showing the principal part of a conventional butterfly valve.
Figure 10:
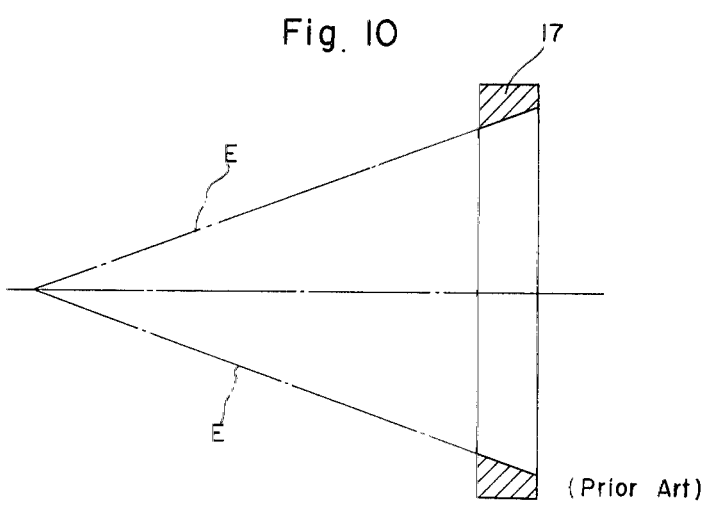

It is in order to overcome the foregoing disadvantage that the valve of FIG. 8 has been devised. However, while this valve is an achievement in respect of the size of the valve body, it leaves the shaping problem unsolved. This has been discussed in the introductory part of this specification. Solutions to such shaping problem associated with the valve construction of FIG. 8 have been developed, and a modification as illustrated in FIG. 10 is contemplated today. According to this modification, the housing 2 and seat 17 are separate bodies, and the inner surface of seat 17 is shaped to coincide with the side of a cone E. After the shaping, the seat is cut into two parts and one of them is then reversed for mounting on housing 2. In this way, the seat 17 ultimately takes the form as shown in FIG. 8. However, compared with the arrangement of the present invention, the conventional valve of FIG. 8 obviously involves a lot of work in shaping the inner surface of seat 17, and is costly with an extra process of such as reversing one half of seat 17.

I claim:

1. A butterfly valve comprising:
   a valve housing having a cylindrical fluid passage therethrough;
   a disc shaped valve body having a hard annular rim of elliptical cross-sectional shape thereon extending in the plane of the valve body rotatable about an axis perpendicular to and intersecting the longitudinal axis of said fluid passage;
   drive means to turn and lock said valve-body;
   a hard annular vavle seat mounted in said housing;
   said seat having an inner annular surface of elliptical cross-sectional shape extending in a plane perpendicular to the longitudinal axis of said cylindrical fluid passage corresponding to the periphery surface of an imaginary cylinder having an axis lying at an angle to the longitudinal axis of fluid passage in the direction of rotation of said valve body, said peripheral surface defining a cross-section in said imaginary cylinder of elliptical shape, the axis of said cylinder intersecting the longitudinal axis of said fluid passage at the same point as the axis of rotation of said valve body, said rim on said valve body having inclined peripheral surface which in the closed position of the valve corresponds to and seals with the inner annular elliptical cross-sectional surface of said seat.

2. A butterfly valve as defined in claim 1 wherein said hard seat and said hard rim are of metal.

3. A butterfly valve as defined in claim 2 wherein the seat is secured to the housing by welding.

4. A butterfly valve as defined in claim 2 wherein the valve housing has an annular groove defined on the inner surface thereof to engage the annular seat, the seat being cooled to contract prior to placing in the groove so that the seat by virtue of expansion fit itself tight in the groove.

5. A butterfly valve as defined in claim 10 wherein the valve housing has an annular groove defined on the inner surface thereof to engage the seat which is circumferentially divided into plural parts.

6. A butterfly valve as defined in claim 5 wherein at least one cutting plane dividing the seat is slanted circumferentially with respect to the radius of the seat.

7. A butterfly valve as defined in claim 5 wherein all cutting planes are arranged radially of the seat, the groove has a width more than twice that of the seat, and a spacer is fitted in the groove for securely holding the seat at one side of the groove.

8. A butterfly valve as defined in claim 5 wherein the seat is secured to the housing with bolts.

* * * * *